US011982089B2

(12) United States Patent
Meyers

(10) Patent No.: US 11,982,089 B2
(45) Date of Patent: May 14, 2024

(54) AWNING ASSEMBLY AND METHOD THEREOF

(71) Applicant: Dometic Sweden AB, Solna (SE)

(72) Inventor: Clayton Meyers, Paw Paw, MI (US)

(73) Assignee: Dometic Sweden AB, Solna (SE)

( * ) Notice: Subject to any disclaimer, the term of this patent is extended or adjusted under 35 U.S.C. 154(b) by 436 days.

(21) Appl. No.: 17/193,122

(22) Filed: Mar. 5, 2021

(65) Prior Publication Data

US 2021/0189733 A1 Jun. 24, 2021

Related U.S. Application Data

(62) Division of application No. 15/581,025, filed on Apr. 28, 2017, now Pat. No. 10,947,737.

(51) Int. Cl.

| | |
|---|---|
| ***E04F 10/06*** | (2006.01) |
| ***E06B 9/70*** | (2006.01) |
| *E04H 15/08* | (2006.01) |

(52) U.S. Cl.

CPC ...... *E04F 10/0648* (2013.01); *E04F 10/0614* (2013.01); *E04F 10/0625* (2013.01); *E04F 10/0651* (2013.01); *E06B 9/70* (2013.01); *E04H 15/08* (2013.01)

(58) Field of Classification Search

CPC .............. E04F 10/0648; E04F 10/0614; E04F 10/0625; E04F 10/0651; E04H 15/08; E06B 9/70; Y10T 403/7075; Y10T 403/587; Y10Y 403/581

See application file for complete search history.

(56) References Cited

U.S. PATENT DOCUMENTS

| | | | |
|---|---|---|---|
| 2,059,153 | A | 10/1936 | Snyder |
| 3,327,724 | A | 6/1967 | Nielsen |
| 3,779,302 | A | 12/1973 | Akers et al. |
| 3,847,171 | A | 11/1974 | Akers et al. |
| 3,991,805 | A | 11/1976 | Clauss |
| 4,117,876 | A | 10/1978 | Bennett |
| 4,164,972 | A | 8/1979 | Richard |
| 4,171,013 | A | 10/1979 | Clark |
| 4,180,117 | A | 12/1979 | Greer |
| 4,188,964 | A | 2/1980 | Greer |
| 4,347,886 | A | 9/1982 | von Knorring |
| 4,494,707 | A | 1/1985 | Niibori et al. |
| 4,524,791 | A | 6/1985 | Greer |
| 4,727,897 | A | 3/1988 | Watts |

(Continued)

FOREIGN PATENT DOCUMENTS

| | | |
|---|---|---|
| DE | 202013000297 | 12/2013 |
| GB | 2445289 | 7/2008 |

OTHER PUBLICATIONS

Retaining Ring Guide: How To Select And Use Retaining Rings, accessed Jul. 31, 2023 from https://www.huyett.com/blog/retaining-rings-selection-guide, available Jun. 16, 2022 (Year: 2022).*

(Continued)

*Primary Examiner* — Abe Massad
*Assistant Examiner* — Jeremy C Ramsey
(74) *Attorney, Agent, or Firm* — Dinsmore & Shohl LLP

(57) ABSTRACT

An awning assembly is provided which provides a push and lock assembly thereby removing the need for additional fastening structures. This also provides for improved assembly of the structures.

7 Claims, 10 Drawing Sheets

(56) References Cited

U.S. PATENT DOCUMENTS 4,810,145 A 3/1989 Villas
4,862,940 A 9/1989 Atchison
4,941,524 A 7/1990 Greer
5,172,743 A 12/1992 Wallace et al.
5,351,736 A 10/1994 Laffler et al.
5,365,989 A 11/1994 Eger et al.
5,383,346 A 1/1995 Laffler et al.
5,427,168 A 6/1995 Lohausen
5,472,007 A 12/1995 Malott
5,549,129 A 8/1996 Becker
5,558,145 A 9/1996 Baka
5,560,411 A 10/1996 Becker
5,566,918 A 10/1996 Becker
5,622,214 A 4/1997 Baka et al.
5,636,675 A 6/1997 Baka et al.
5,669,430 A 9/1997 Malott
5,732,756 A 3/1998 Malott
5,924,465 A 7/1999 Malott
5,944,085 A 8/1999 Malott
6,000,501 A 12/1999 Evans
6,006,810 A 12/1999 Malott
6,021,834 A 2/2000 Malott
6,021,835 A 2/2000 Malott
6,029,732 A 2/2000 Malott
6,089,306 A 7/2000 Frey, Jr.
6,112,392 A 9/2000 Becker et al.
6,206,078 B1 3/2001 Frey, Jr.
6,276,424 B1 8/2001 Frey, Jr.
6,279,641 B1 8/2001 Malott
6,341,638 B1 1/2002 Thompson et al.
6,361,570 B1 3/2002 Gow
6,488,069 B1 12/2002 Mashaw et al.
6,497,267 B1 * 12/2002 Azar .................... H02K 7/1166
242/906
6,829,861 B1 12/2004 Kobrehel et al.
6,840,568 B2 1/2005 Carrillo et al.
6,843,301 B2 1/2005 Carrillo et al.
6,874,559 B1 4/2005 Hicks
6,971,433 B2 12/2005 Wagner et al.
7,077,458 B2 7/2006 Malott et al.
7,121,314 B2 10/2006 Hicks et al.
7,281,560 B2 10/2007 Hicks et al.
7,556,079 B2 7/2009 Hicks et al.
7,628,194 B2 12/2009 Wagner et al.
7,730,930 B2 * 6/2010 Malausa ................ B60J 1/2019
160/310
7,828,036 B2 11/2010 Tran
7,967,050 B2 6/2011 Gutierrez
8,006,737 B2 8/2011 Popa
8,205,656 B2 6/2012 Ma
8,336,256 B2 12/2012 Jeffrey et al.
8,752,565 B2 6/2014 McConnell et al.
8,752,606 B2 6/2014 Albrecht
8,789,841 B2 7/2014 Laipple
8,887,785 B2 11/2014 Goth
8,960,256 B2 * 2/2015 Wagner ............... E04F 10/0648
160/70
9,175,481 B2 11/2015 Albrecht et al.
9,228,359 B2 1/2016 Taylor
10,947,737 B2 3/2021 Meyers
2004/0221965 A1 11/2004 Wagner et al.
2005/0072532 A1 4/2005 Holden et al.
2013/0098562 A1 4/2013 Gutierrez
2013/0333736 A1 * 12/2013 Albrecht ............. E04F 10/0648
135/88.12
2014/0352893 A1 12/2014 Malott
2015/0184700 A1 * 7/2015 Balsiger ................ F16H 49/001
74/405
2017/0138056 A1 5/2017 Albertson
2017/0275884 A1 * 9/2017 Thompson .......... E04F 10/0692
2018/0313090 A1 11/2018 Meyers

OTHER PUBLICATIONS

Transmittal Letter of Related Cases, Aug. 24, 2018.
Canadian Patent Application 3,001,819 filed Apr. 14, 2018 entitled "Awning Assembly and Method Thereof".
Final Office Action mailed in U.S. Appl. No. 15/581,025 dated Mar. 2, 2020.
Notice of Allowance mailed in U.S. Appl. No. 15/581,025 dated Oct. 29, 2020.
Office Action mailed in U.S. Appl. No. 15/581,025 dated Aug. 21, 2019.
Restriction Requirement mailed in U.S. Appl. No. 15/581,025 dated Mar. 4, 2019.
U.S. Appl. No. 15/581,025 entitled "Awning Assembly and Method Thereof" filed Apr. 28, 2017.
Australian Patent Application No. 2016222517 entitled "Awning Assembly" filed Sep. 5, 2016.
Canadian Patent Application No. 2,942,465 entitled "Awning Assembly" filed Sep. 20, 2016.
Canadian Patent Application No. 2,948,063 entitled "Awning Assembly Attachment" filed Nov. 10, 2016.
Carefree of Colorado; Buena Vista, 16 pages, https://www.e-carefree.com/documentation/tech/052578-001r2%20Buena%20Vista.pdf Mar. 1, 2013.
Dometic Products, 2014 Full Line Catalog; Dometic Awnings; Patty O'Room Jan. 1, 2014.
U.S. Appl. No. 15/223,825 entitled "Awning Assembly" filed Jul. 29, 2016.
Office Action issued in Canadian Patent Application 3001819 mailed on Jan. 18, 2024.

* cited by examiner

AWNING ASSEMBLY AND METHOD THEREOF

CLAIM TO PRIORITY

This divisional patent application claims priority to and benefit of, under 35 U.S.C. § 121, U.S. patent application Ser. No. 15/581,025, filed Apr. 28, 2017 and titled "Awning Assembly and Method Thereof", all of which is incorporated by reference herein.

BACKGROUND

Field of the Invention

Present embodiments generally relate to an awning assembly and method thereof. More particularly, present embodiments relate to, without limitation, an awning assembly which has a push and lock assembly of the motor and/or drive relative to the awning roller tube and/or end cap.

Description of the Related Art

The use of awnings on recreational vehicles (RVs), mobile homes, marine craft and fixed structures such as patios at residential homes and/or commercial structures, is desirable due to the increased useability of the square footage gained beneath the awning structure. During an assembly process, the original equipment manufacturer (OEM), for example, installs the awning on an RV. This may also be done by an end-user. It is always desirable to provide continuous improvement in the assembly process for these OEMs or other installers. One problem that installers continually have is the use of various hardware fasteners such as rivets, nuts and bolts and/or self-tapping screws to connect the end cap to the awning roller and the drive and/or motor to the end cap and/or the awning roller tube. However, the large number of parts can lead to confusion of the installer and/or incorrect installation. It is desirable to reduce the number of parts required for installation. It is also desirable to reduce the complexity of the various assemblies being installed and assembled.

Ultimately, it would be desirable to provide an assembly which eases the burden of installation and assembly of an awning assembly. It would be desirable to reduce the number of components required to provide such assembly.

Accordingly, it would be desirable to overcome these and other issues in order to provide an awning assembly which reduces complications associated with installation. It would also be desirable to overcome the problems associated with existing configurations to reduce complications associated with parts and confusion during installation due to such number and types of parts.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

According to at least one first embodiment, an awning assembly comprises a motor or drive having a driveshaft, an awning roller tube, an end cap disposed on the roller tube, the end cap having a hole with at least one keyway, a spring disposed on the driveshaft having at least one wing, the wing aligned with a hub in one of the end cap or the awning roller tube, the spring engaging one of the end cap or the awning roller tube to unremovably lock the motor or drive in position relative to said awning roller tube and end cap.

According to optional embodiments, any of the following options may be used alone or in combination with other optional embodiments with the first embodiment. The awning assembly may further comprise a plurality of strengthening ribs extending from the hub to a periphery of the end cap or the awning roller tube. The spring may extend through at least one axial side of the hub. The at least one wing may expand to lock the motor and driveshaft to the end cap and the awning roller tube. The driveshaft may have a key surface which extends into the keyway. The motor may be operably connected to awning hardware.

According to at least one second embodiment, an awning assembly comprises an awning roller tube an end cap disposed on at least one end of the awning roller tube, a drive shaft extending from one of a motor or drive, the drive shaft extending through the end cap and being locked in position internally of at least one of the cap and the awning roller tube without any need for tools to engage the drive shaft and the one of said cap and the awning roller tube.

According to optional embodiments, any of the following options may be used alone with the first or second embodiments or in combination with any of the following other options and the first or second embodiments. The awning assembly may further comprise an expandable spring which is compressed to allow the driveshaft to pass through at least one of the end cap and the awning roller tube and expands when passed through the at least one of the end cap and the awning roller tube. The driveshaft may have a shoulder which engages the spring. The awning assembly wherein the at least one of a motor or drive is a push and lock relative to at least one of the awning roller tube or the end cap. The awning assembly may further comprise a spring located on one of the drive shaft, the end cap or within the awning roller tube.

According to at least one third embodiment, a method of assembling an awning assembly may comprise the steps of connecting a motor to awning hardware, compressing a spring as it passes through an end cap, expanding the spring within at least one of the end cap or an awning roller tube to lock a motor to at least one of the cap or said awning roller tube.

According to optional embodiments, the third embodiment further comprises permanently locking the motor to the at least one of the end cap and the awning roller tube.

According to a further embodiment, a method of assembling an awning assembly comprises the steps of providing at least one of a motor and drive having a drive shaft, providing an awning roller tube and an end cap, pushing and locking one of: (a) the drive shaft to the end cap or (b) the end cap and the drive shaft to said awning roller tube, and wherein the locking is done without screw fasteners.

According to optional embodiments any of the following options may be utilized with the third or final embodiments alone or in combination with any other options and at least one of the third or final embodiments. The method may further comprise adding a spring to the drive shaft. The method may further comprise adding a spring to a hub on the end cap or the awning roller tube.

All of the above outlined features are to be understood as exemplary only and many more features and objectives of an awning assembly may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the awning assembly will now be described by way of examples. These embodiments are not to limit the scope of the claims as other embodiments of the awning assembly will become apparent to one having ordinary skill in the art upon reading the instant description. Non-limiting examples of the present embodiments are shown in figures wherein:

DETAILED DESCRIPTION

Figure 1:
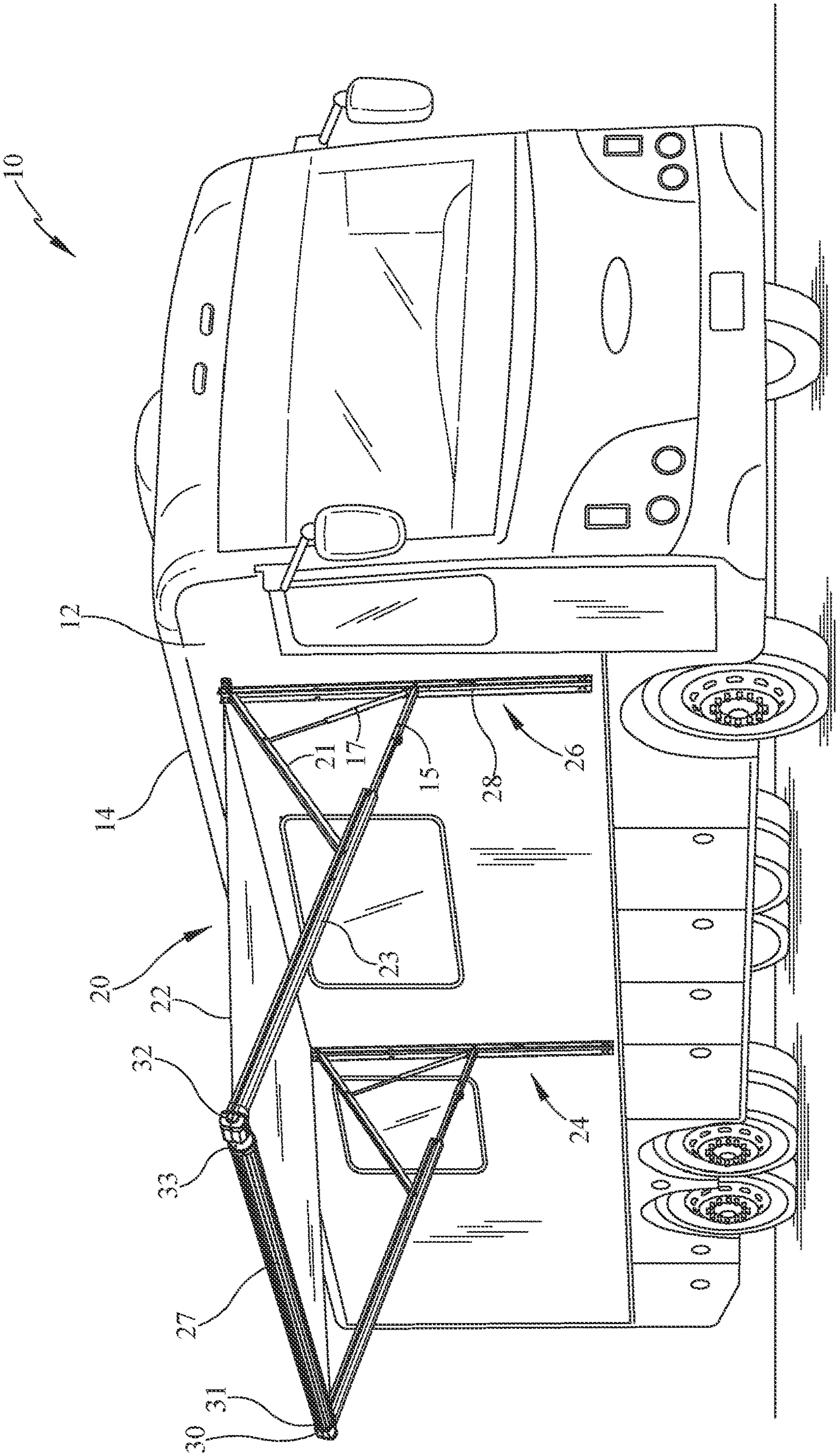
FIG. 1 is a perspective view of a recreational vehicle (RV) with an illustrative awning assembly on an exterior thereof.

It is to be understood that the awning assembly is not limited in its application to the details of construction and the arrangement of components set forth in the following description or illustrated in the drawings. The multiple embodiments are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-10 various embodiments of an awning assembly. The instant awning assembly allows for connection of a drive assembly and an awning end cap or an awning roller tube in a locked and non-removable fashion such that any removal would require at least some destruction of the spring and/or other components which retain or are retained together. By utilizing this manufacturing technique however, the installers may more easily assemble the awning assembly and install such at whatever location is pertinent and in an easier manner, with fewer parts and with less likelihood of damage to the awning during the installation process. In some non-limiting embodiments, a head, for example a spring, is utilized to engage a drive shaft of the drive assembly relative to an end cap. In other embodiments, however, the drive assembly may be connected to the end cap and the end cap may be snap locked or otherwise engaged by a spring structure to the awning roller tube such that it may not be removed once connected.

Referring now to FIG. 1, a perspective view of a recreational vehicle (RV) 10 is depicted. The illustrative RV 10 includes a drive and a transmission, not shown, as well as at least one sidewall 12 and a roof 14. It should be understood that although an RV 10 is referred to in the exemplary embodiments, one skilled in the art should understand that the use of the embodiments described herein is not limited to these drivable vehicles. The term "RV" is also meant to include towable structures, sometimes called campers, commercial vehicles, agricultural vehicles, horse trailers, boats or other marine applications, temporary structures used at sports events (i.e. tailgating), as well as stationary structures such as homes, commercial buildings, flea markets, or other stationary structures. Further, the embodiments may also be used with fixed structures having such shade canopies and therefore, the term RV is not limited to mobile structures but may also include fixed structures. All of these structures are considered to be usable with the awning assembly attachment of the present embodiments.

An awning assembly 20 is connected to the sidewall 12 and/or the roof 14 of the vehicle 10. In other embodiments, the awning assembly 20 may be retractable within the sidewall 12 so as to reduce the airflow interference of the awning assembly 20 while the vehicle 10 is being operated. The awning assembly 20 may be defined by various structures such as roller type awning, cassette awning or other types. For example, the awning assembly 20 may include a roller tube 27 which rotates but does not translate or in some embodiments, a roller tube which rotates and translates.

Figure 2:
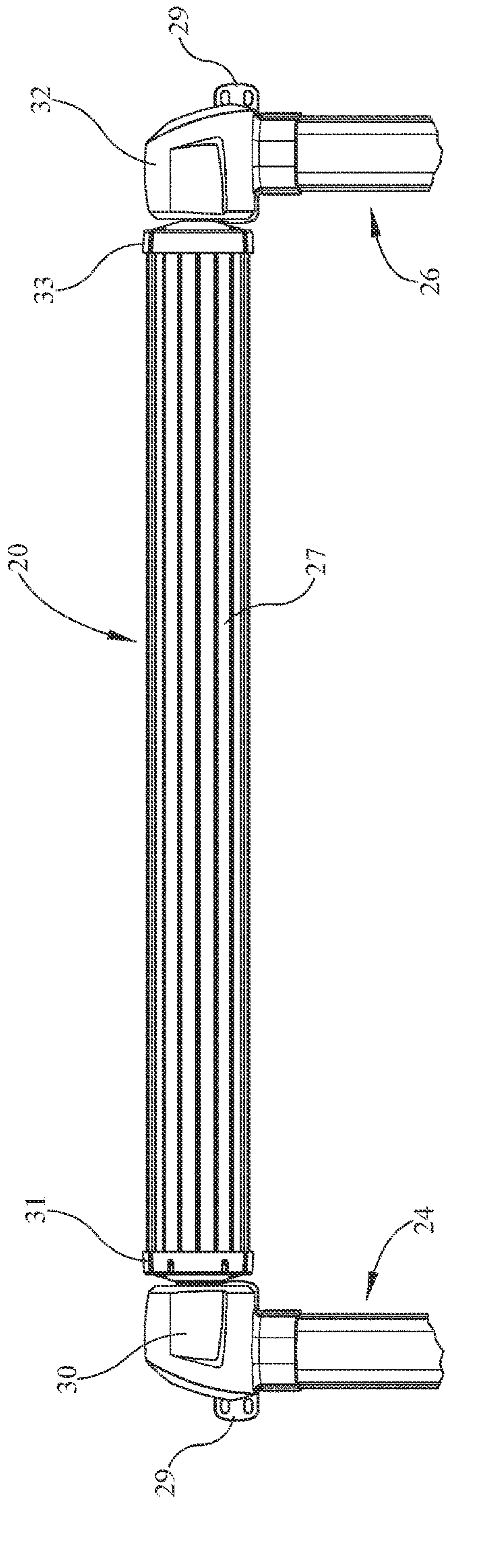
FIG. 2 is a front view of a portion of the illustrative awning assembly removed from the RV.

The awning assembly 20 includes an awning or canopy 22 and hardware assemblies 24, 26 defined by at least one first arm 28 and at least one second arm 23. The awning hardware assembly 24 is utilized, according to the instant embodiment, to connect the awning assembly 20 to the sidewall 12 of, for non-limiting example, the vehicle 10 or other fixed or mobile structure. The hardware assembly 24 allows for support of the canopy 22 in an extended position (shown) and/or in a retracted position (FIG. 2). The hardware assemblies, also referred to as hardware, 24, 26 support the awning roller tube 27. The roller tube 27 may be embodied by a tube which, in some embodiments, rotates to either extend or retract, or the awning canopy 22 rotates and translates, or a non-rotating bar of circular or non-circular cross-section. In the non-rotating embodiment, the roller tube 27 may be fixed in position at the sidewall and solely rotates to extend and retract the canopy 22, and accordingly, the non-rotating bar is located near the leading edge of the canopy 22 which extends and retracts as discussed in further embodiments. In the instant non-limiting embodiment, the awning roller tube 27 rotates and translates with the extension or retraction process. Optionally, the hardware assembly 24 may also provide a pathway for wiring from a power source to the roller tube 27 to drive a motor or alternatively, for example may be routed through a hem in the canopy 22. Other wiring pathways may also be used however.

The canopy 22 includes an inner edge closer to the sidewall of an RV 10 or fixed structure sidewall. The canopy 22 also includes an outer edge or leading edge further from the RV or fixed structure sidewall. In the instant embodiment, the inner edge may be connected to an awning rail and the outer edge may be connected to the roller tube 27, for example in an awning channel or groove. Extending between the inner and outer edges are first and second lateral edges.

The roller tube 27 may be circular in cross-sectional shape in some embodiments. The roller tube 27, may include a first end and a second end with end caps 31, 33 respectively. The roller tube 27 may be rotatably supported at or near ends to allow rotation for extension and retraction of the awning canopy 22. However, as will be described further, the present embodiments need not be limited to roller tube embodiments, as other types of awnings may be utilized, for example cartridge awnings.

Referring still to FIG. 1, the awning assembly 20 includes the awning canopy 22 and the first and second hardware assemblies 24 and 26. The instant hardware assemblies are defined by 4-bar linkages, but various other structure types may be utilized and this embodiment is merely illustrative. In this embodiment, each of the hardware assemblies 24, 26 are generally formed in the same way and therefore only hardware assembly 24 will be described. However, these hardware assemblies 24, 26 may be different and may also be embodied in differing forms from that which is depicted. The hardware assemblies 24, 26 support the canopy 22 in the extended position (shown) and collapses to a compact, nested arrangement when the awning assembly 20 is retracted for road travel or when weather conditions preclude extension of the awning assembly 20. In the extended position depicted, portions of the hardware assemblies 24, 26 extend outwardly from the RV sidewall 12. As shown in FIG. 2, in the retracted position, the hardware assemblies 24, 26 are generally positioned in a vertical arrangement near lateral edges of the canopy 22 and along sidewall 12 of the RV 10.

The awning assembly 20 includes at least one hardware assembly 24, which may include a plurality of arms 28, 21, 23, 15 defining a four bar linkage comprising a first base arm 28, a second top arm 21, a third extending arm 23 and a fourth adjustable arm 15, which may allow for pitch adjustment. Each hardware assembly 24, 26 may comprise one or more supports including the first arm 28, which is mounted to the sidewall 12 (FIG. 1). The second arm 21 is pivotally connected to and extends from the first arm 28. In the exemplary embodiment, the second arm 21 may extend from the upper end, however this is not limiting and merely one example of a configuration which may be utilized. The second arm 21 may be further sized so as to be in a nested arrangement with either or both of the first arm 28 and a third arm 23, which may be pivotally connected to an opposite end of the second arm 21 and spaced from the first arm 28. One or more struts 17 may be utilized to control movement of the second and third arms 21, 23. Additionally, the adjustable arm 15 may be utilized to position and adjust the extended configuration of the awning hardware assemblies 24, 26.

Referring now to FIG. 2, a front view of the awning assembly 20 is depicted. The canopy 22 is removed and portions of the hardware assemblies 24, 26 are not shown. The awning assembly 20 comprises the awning roller tube 27, as well as first and second end caps 31, 33 at ends of the roller tube 27. Adjacent to the end caps 31, 33 are covers 30, 32 which hide a connection point between the awning roller tube 27 and the hardware assemblies 24, 26. At ends of the roller tube 27, the hardware assemblies 24, 26 rotatably support the roller tube 27. The covers 30, 32 inhibit a user from pinching a finger or arm in the moving parts of the awning where the awning roller tube 27 connects to the hardware assemblies 24, 26. The covers 30, 32 provide an improved appearance as well. Additionally, the covers 30, 32 inhibit some contaminants from damaging the pivoting joints which rotatably support the awning roller tube 27 and end caps 31, 33. Each of the covers 30, 32 may be a one-piece or multi-piece design. The covers 30, 32 engage the hardware assemblies 24, 26 and allow for engagement of the end caps 31, 33 on the awning roller tube 27, or both. Mounts 29 are shown as well for connecting the awning assembly 20 to a surface such as sidewall 12 (FIG. 1). The hardware assemblies 24, 26 pivot outwardly from the RV and during the unfurling or extension movement of the awning assembly 20. As this occurs, the canopy or awning material 22 (FIG. 1) extends from the RV sidewall 12 with the awning roller tube 27 to create a covered, shaded area beneath.

Figure 3:
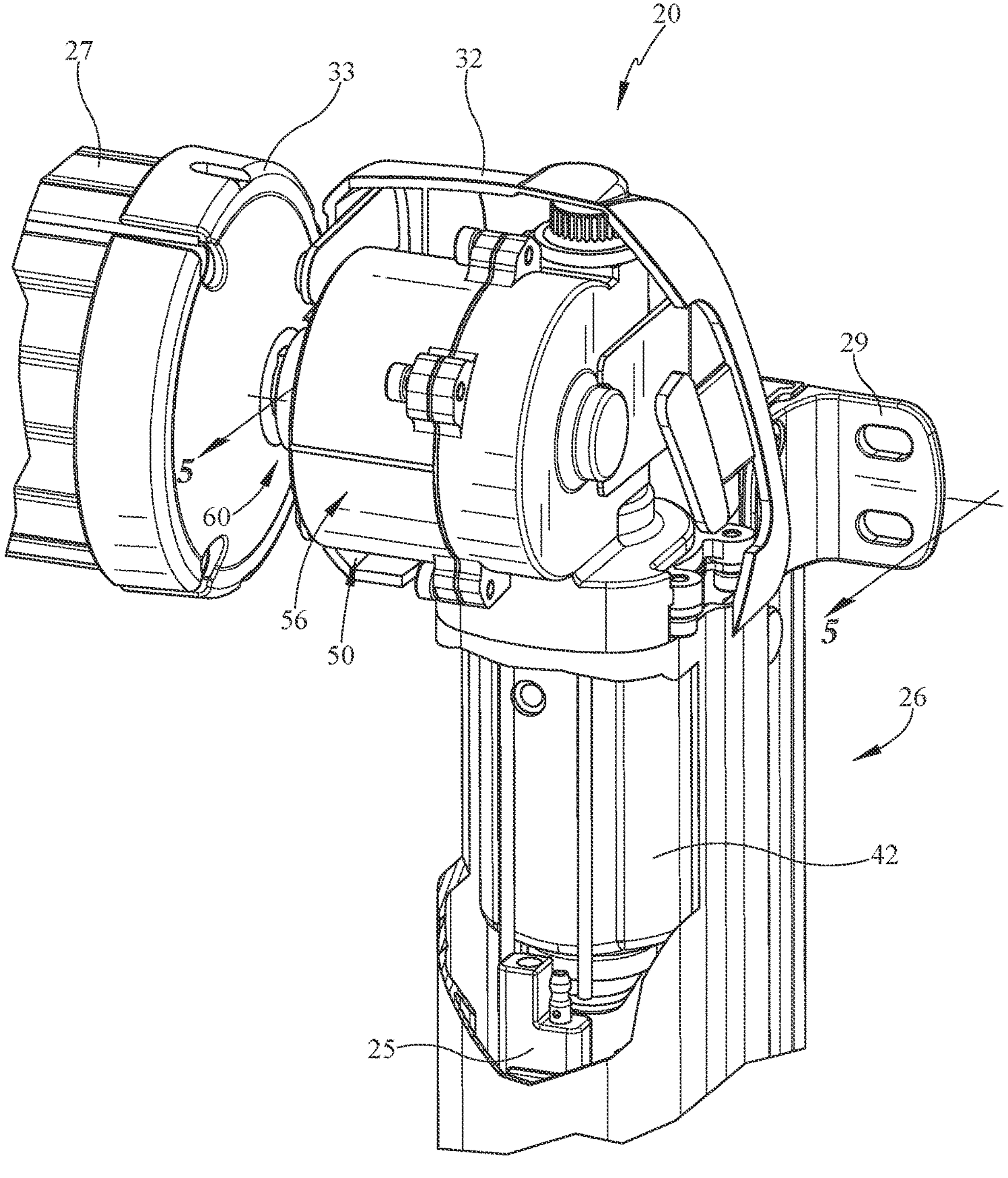
FIG. 3 is a front perspective view of a portion of the awning assembly with a cover partially removed and an awning hardware also partially removed.

Referring now to FIG. 3, a detailed perspective view of a portion of the awning assembly 20 at one of the joints of the awning assembly 20 is depicted. In this view, the roller tube 27 and the end cap 33 are shown near the cover 32, which is partially removed from the hardware assembly 26. In this portion of the awning assembly 20 is a drive assembly 50. In some embodiments, the drive assembly 50 may be defined by a motor 42 or may be defined by a motor 42 and drive or transmission 56. Within the hardware assembly 26 is a motor 42. In the illustrative embodiment, the motor 42 is connected to a drive or transmission 56 together which define the drive assembly 50. The drive assembly 50 may also comprise at least one drive shaft 60 which extends from the drive 56 and toward the end cap 33 or the awning roller tube 27, or both. In some embodiments, the motor 42 may be used without a drive 56 and accordingly, in such embodiment, the drive shaft 60 may extend directly from the motor 42. In some embodiments, a motor 42 and drive assembly 50 are used, the motor 42 may be aligned with the drive 56 rather than at an angle, such as shown at the 90 degree orientation depicted in FIG. 3. Further, other angles may be utilized and the right angle motor 42 (FIG. 3) and drive assembly 50 (FIG. 3) arrangement may be altered and still be within the scope of present embodiments.

As shown in the hardware assembly 26, adjacent to the motor 42, a connector 25 is depicted. The connector 25 is shown and represents one illustrative manner in which electrical wiring may be provided through the hardware 26 and to the motor 42 for powering thereof. Other conduits for running wiring may be utilized.

Figure 4:
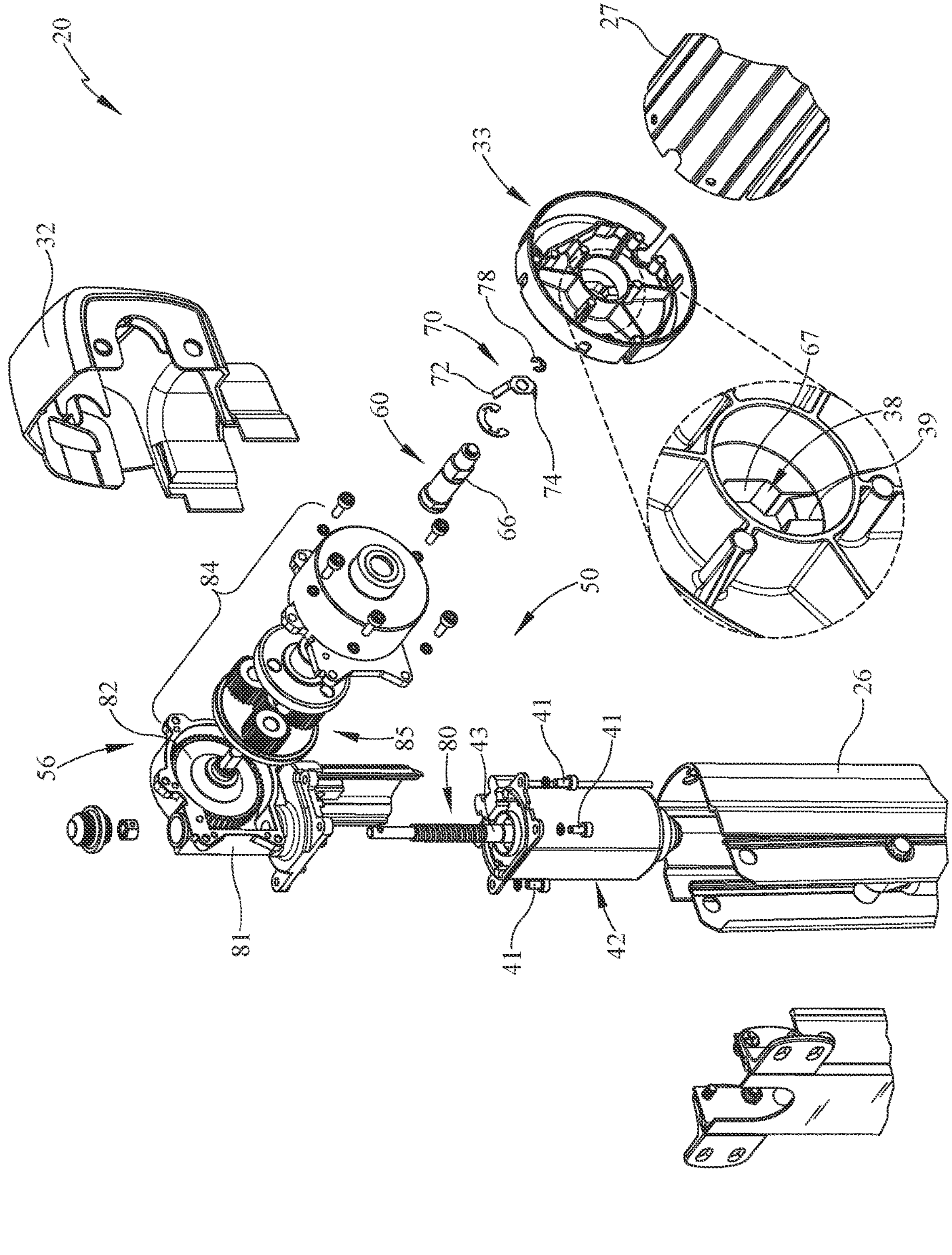
FIG. 4 is an exploded perspective of a portion of the awning assembly.

Referring now to FIG. 4, an exploded perspective view of a portion of the awning assembly 20 is depicted. In this view, the cover 32 and hardware assembly 26 are exploded to reveal interior components including the drive assembly 50 including, in some embodiments, the motor 42 and drive 56. The drive 56 may be an angled drive meaning the input of the drive is at one angle and the output is at a second angle, as shown. In other embodiments, the input and output may be aligned or may also be parallel in some embodiments. In some embodiments, the motor and drive may be angled relative to one another or may be aligned. Further, the motor 42 is shown through the hardware 26 but when assembled, may be inserted within the hardware assembly 26, fully or partially.

Various characteristics may be considered in the selection of the motor 42. Some non-limiting characteristics which may be used to size the motor 42, desired torque at a roller tube 27, rotational speed of the roller tube 27, and gear motor 42 size or limitations if mounted within the hardware or other structures. The motor 42 may be a 12 volt DC motor which may have, for example, a 400 in-lbs stall torque and 300 in-lbs operational torque and may drive an RPM of 25 RPM at an output drive shaft 60. However, this is merely one embodiment and others may be utilized depending on size and weight characteristics of the awning assembly 20, as well as other design characteristics which may vary. For example a 24V motor may be used. The motor 42 has a drive shaft 43 which may be connected to or integrally formed with a worm gear or other gear structure which operably engages the transmission 56.

The drive assembly 50 comprises the motor 42 and a transmission or drive 56. The drive 56 may be an angled drive and in the illustrative embodiment may be a right angle drive. The right angle drive may be provided in some non-limiting embodiments by a worm 80, a worm gear 82 and a gear box 84 having a plurality of gears 85 therein. In the instant embodiment, the drive 56 may include a lower input which is vertically oriented in the instant embodiment, and an output which is horizontal in the instant embodiment and coaxial with the roller tube 27.

According to the instant embodiment, the motor 42 drives a worm 80 which extends from the motor 42 and is in a worm housing 81. The worm 80 may be formed on a motor shaft 43 or connected to the motor shaft 43. Thus the worm 80 may be the drive input shaft 58 (FIG. 5) or the worm 80 may be connected to a drive input shaft 58. The worm 80 drives a worm gear 82 which in turn drives gears 85 in the gear box 84. The worm 80 may be formed on a motor shaft or may be connected by, for example, placing a worm 80 over the motor shaft 43, and may be fixed to the motor shaft for rotation with the motor 42. As the worm 80 and the worm gear 82 rotates, a plurality of gears 85 on the interior of the gear box 84 causing rotation of an output drive shaft 60. The output drive shaft 60 rotates causing rotation of roller tube 27 by connection and/or engagement of the end cap 33.

The above design characteristics, for example, speed or torque may also be measured at the drive shaft 60 rather than the roller tube 27. In the illustrated embodiment, the shaft 60 extends from the gear box 84 into the end cap 33 and/or awning roller tube 27. In some embodiments however, the shaft 60 may extend from the roller tube 27 into the gear box 84. The gear architecture, gear sizes and ratios may be sized and adjusted depending on the desired speed and torque at the shaft 60 or the roller tube 27. Additionally, the transmission 56 may include one or more joints to compensate for off-axis operation of the roller tube 27 wherein the roller tube 27 is not aligned with the drive shaft 60 of the drive 56.

The motor 42 and the drive 56 may be manufactured as a single structure or may be joined together as shown by fasteners 41. Either embodiment is considered within the scope of the present claims. Further the drive assembly 50 may comprise an angled transmission which receives an input in one direction and provides an output in a second direction which is non-coaxial and/or non-parallel to the first direction. In this embodiment, the worm 80 receives input in a direction, at least in part, determined by the motor 42 and the gear box 84 provides an output at drive shaft 60 in a second direction, which according to some embodiments, is generally a right angle, although such angle should not be considered limiting. Still further, the motor 42 and drive 56 may be aligned rather than the angled configuration shown, depending on the arrangement of the awning assembly 20.

Exploded from the drive shaft 60 may be a head which according to some embodiments may be a spring 70. The head passes through the end cap 33 and/or the awning roller tube 27 and once past a threshold, will retain the drive assembly 50 and hardware 26 to the end cap 33 and/or awning roller tube 27. The head may be formed in various manners including formed integrally on the shaft 60 or connected thereto. The head may be formed in various manners and according to the illustrative, non-limiting embodiment, the head is defined by a spring 70 which has wings 72, 74 that expand once the spring 70 moves beyond the threshold, which may be defined by either or both of the end cap 33 and awning roller tube 27. Once the spring 70 is expanded, the shaft 60 cannot be removed from the end cap 33 or awning roller tube 27 and the structures is assembled and retained together. A clip 78 is also shown which retains the spring 70 or head on the drive shaft 60.

Figure 5:
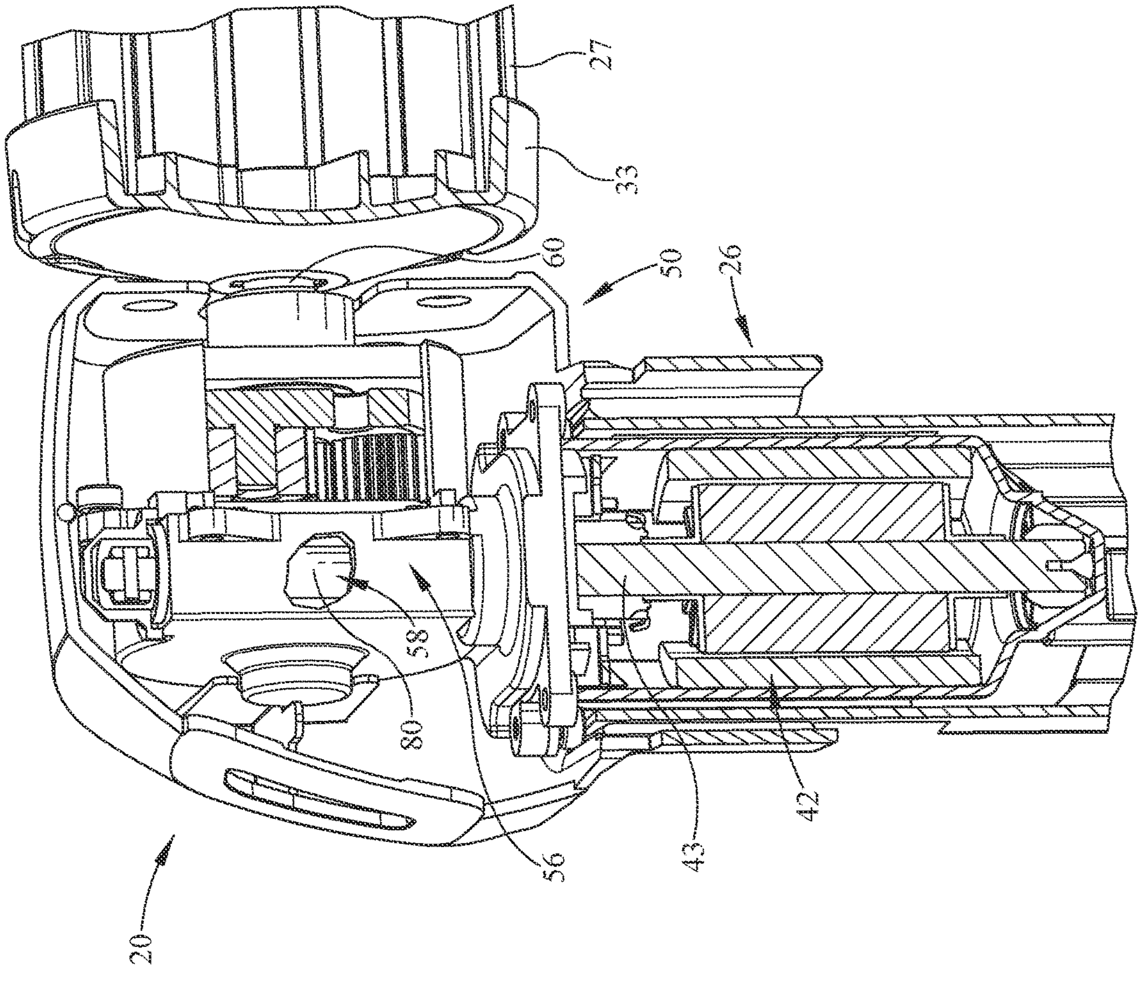
FIG. 5 is a rear section view of the awning assembly of FIG. 3.

Referring now to FIG. 5, a rear section view of a portion of the awning assembly 20 is depicted, sections along line 5-5 of FIG. 3. The section view is cut to depict the motor 42 and input shaft 58 to the drive 56. The drive assembly 50 comprises the drive 56, which includes an input shaft 58 to provide rotation to the drive 56. The rotation is input from the motor 42 and the input shaft 58 may be the motor shaft 43, engaging the drive 56, or the input shaft 58 a distinct structure which may be coupled to the motor shaft 43. For example, in some embodiments, the input shaft 58 may be a worm which engages a worm gear. The input shaft 58 may rotate one or more gears of the drive 56 in order to cause rotation of an output drive shaft 60. The drive shaft 60 speed and torque may be varied by varying the gear sizes and the input speed and/or torque of the motor 42. Accordingly, such speed and torque output at the drive shaft 60 may be dependent upon the length of the awning assembly 20 (FIG. 1) and the requirements necessary to rotate such canopy 22 (FIG. 1) and awning roller tube 27 (FIG. 1).

As indicated previously, the drive shaft 60 may also extend from a motor 42 or may extend from a drive, such as the drive 56, or an alternate drive type. For example, various drive types may be utilized in the drive 56. The instant embodiment may utilize a worm and a worm gear to drive the gears, while various alternate types of drives, geared or otherwise, may be utilized if a drive 56 is positioned between the motor 42 and the awning roller tube 27. According to the instant embodiment, the motor 42 may cause rotation of drive 56 and the awing roller tube 27.

Figure 6:
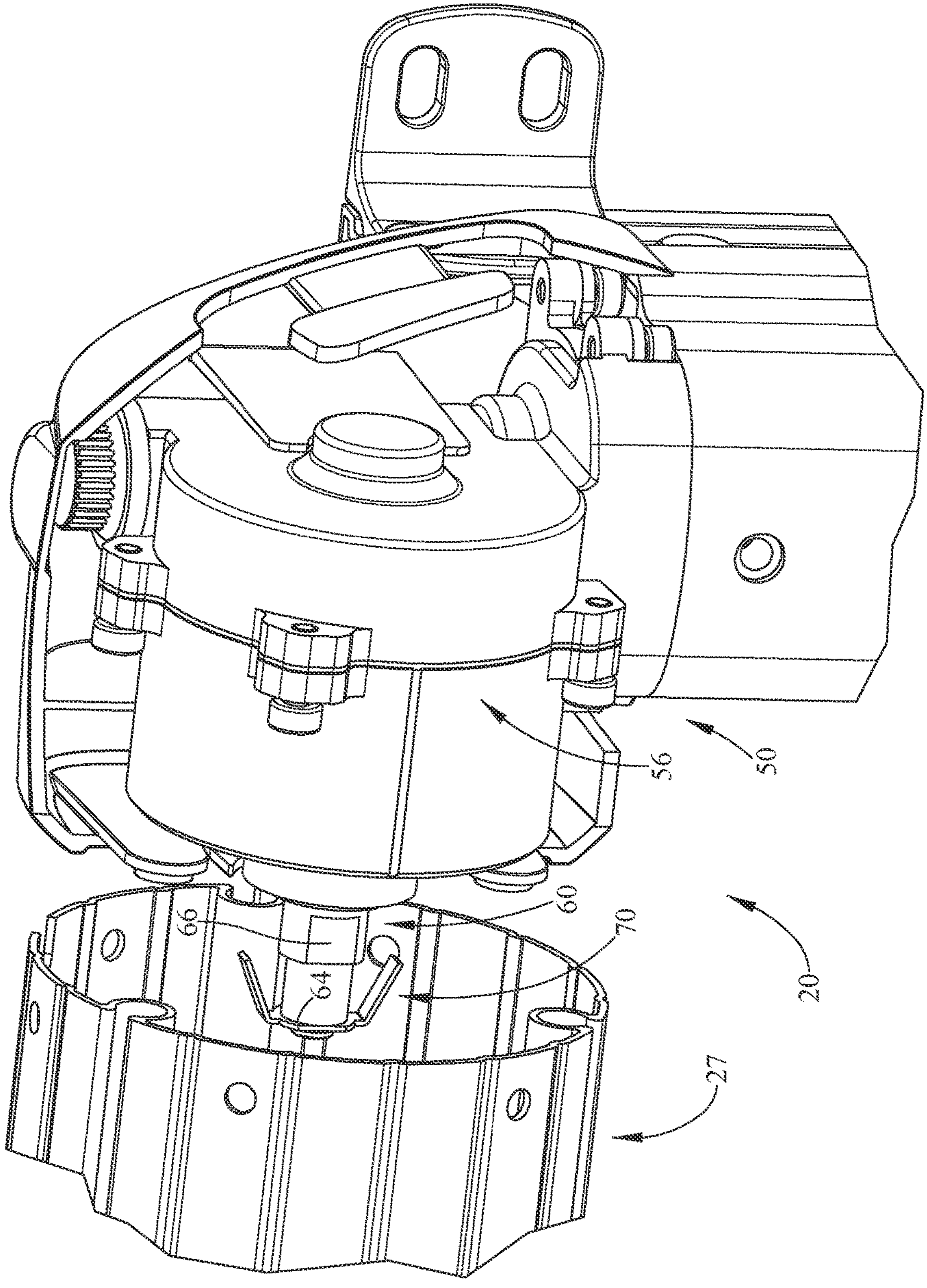
FIG. 6 is a front partially exploded view of the awning assembly.

Referring now to FIG. 6, a partially exploded perspective view of a portion of the awning assembly 20 is depicted. In this view, the awning roller tube 27 is exploded away from the drive 56 and the end cap 33 (FIG. 4) is removed to depict the drive shaft 60 extending at or near the end of the awning roller tube 27. In the instant illustrative embodiment, the drive shaft 60 includes a shoulder 64 against which the spring 70 is located. Again, other forms of a head may be utilized but the use of a spring structure provides for expansion of the head once it is past a threshold within either or both of the end cap 33 or awning roller tube 27. The drive shaft 60 is generally cylindrical but various shapes may be utilized and may further comprise a key surface 66 which allows the shaft 60 to engage the end cap 33. With the engagement of the key surface 66 through a keyway 38 (FIG. 4) in the end cap 33, the rotation of the drive shaft 60 causes rotation of the awning roller tube 27.

With additional brief reference to FIG. 4, the end cap 33 is shown with a detail view. The keyway 38 is shown with a shape corresponding to the shaft 60 and specifically the key surface 66. The keyway surface 67 is engaged by the key surface 66. Various structures for engagement may be alternatively used.

Additionally, during insertion of the drive shaft 60 into the end cap 33 and/or roller awning tube 27, the spring 70 is compressed so that the spring can pass through the end cap 33. Once the spring 70 passes through the end cap 33, the spring expands and locks the drive shaft 60 to the end cap 33 and/or awning roller tube 27. This eliminates the need for further fasteners such as nuts and bolts, rivets or lock washers, all of which are desired to reduce or eliminate by installers. Alternatively, rather than compress the spring 70, the area of the end cap 33 or awning roller tube 27 which is engaged by the spring 70 may expand slightly to allow the passage of the spring or head there through.

Figure 7:
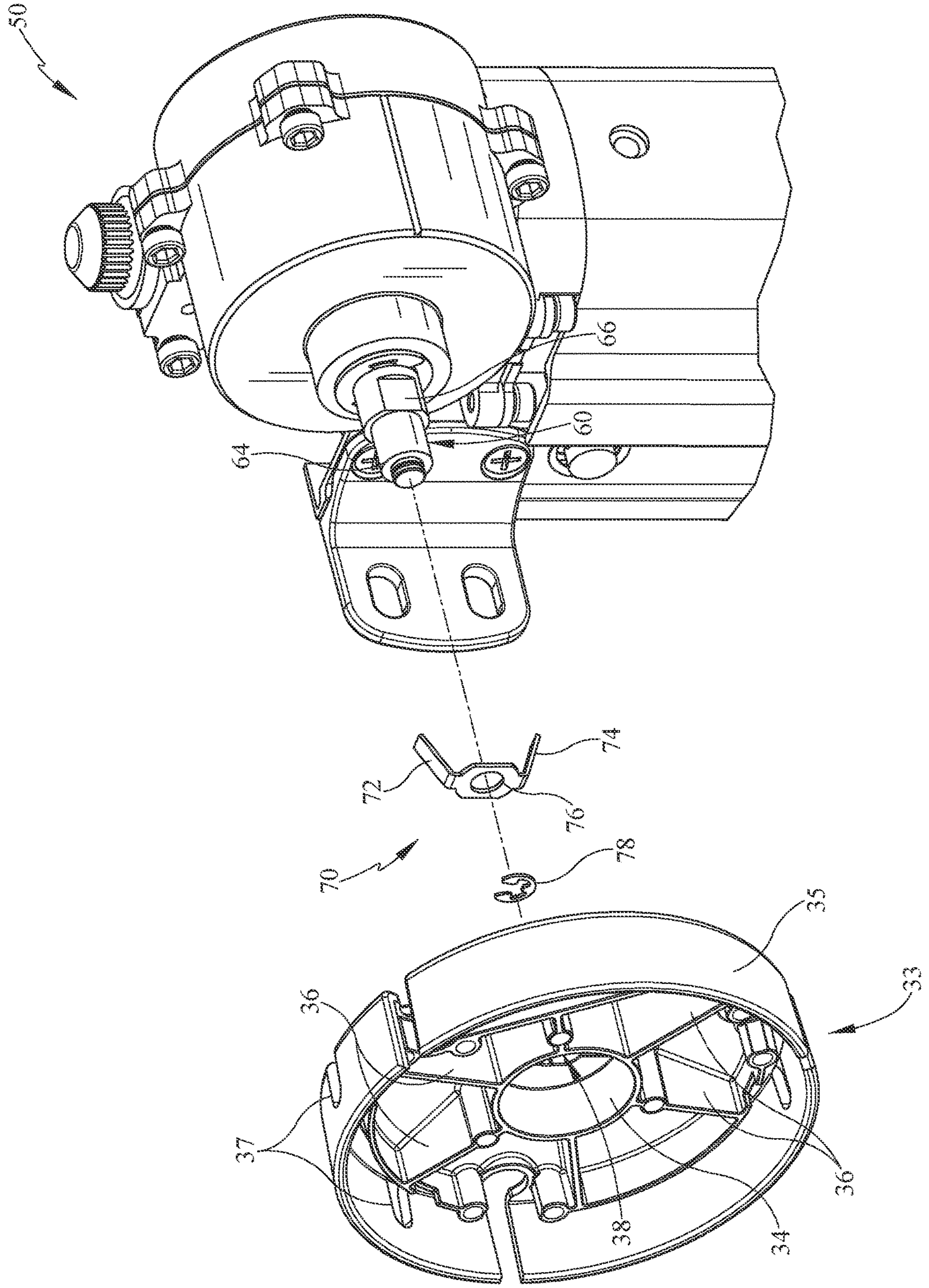
FIG. 7 is an exploded perspective view of the drive assembly, the end cap and a spring lock.

Referring now to FIG. 7, an exploded perspective view of the end cap 33 and drive shaft 60 is depicted. The drive assembly 50 is shown having the drive shaft 60. One skilled in the art will recognize this may be a shaft from a motor or a drive, as depicted. The drive shaft 60 extends from the drive assembly 50 and includes the shoulder 64 and the key surface 66. The end cap 33 is shown spaced from the drive shaft 60. The end cap 33 includes a hub 34 and a peripheral circumferential surface 35. Extending between the hub 34 and the peripheral circumferential surface 35 are strengthening ribs 36. The end cap 33 may also include fastener holes 37 for screws or rivets which connect the end cap 33 to the awning roller tube 27 (FIG. 6). The interior of the hub 34 includes a keyway 38 which has flat surfaces which correspond to the key surfaces 66 of the drive shaft 60. The drive shaft 60 extends at least partially through the hub 34 so that the key surface 66 engages the keyway 38 allowing torque transfer.

Shown between the drive shaft 60 and the end cap 33 is the spring 70. The spring 70 includes at least one wing 72 and, according to the instant embodiment, includes first and second wings 72, 74. The spring 70 includes a central aperture 76 which allows the spring 70 to pass on to an end of the drive shaft 60. The aperture 76 is smaller than the diameter of the shoulder 64 so that the spring 70 engages the shoulder 64 and is located. The drive shaft 60 also includes a groove 62 so that when the spring 70 is located against the shoulder 64, the groove 62 is exposed slightly and a clip 78 may lock the spring 70 onto the drive shaft 60. Other arrangements and/or configurations may be used to lock the drive shaft 60 to at least one of the end cap 33 and the awning roller tube 27.

To insert the drive shaft 60 into the end cap 33, the wings 72, 74 need only be compressed to allow passage through the keyway 38. The keyway 38 is generally located within the hub 34 and has a peripheral edge which is spaced from the hub 34 creating a distance between a wall of the hub 34 and the keyway 38. Within this distance, the spring 70 may expand to lock the drive shaft 60 in position relative to the end cap 33. Once the spring 70 clears the keyway 38, the wings 72, 74 can expand within the hub 34 and thereby lock the drive shaft 60 to the end cap 33 and/or the awning roller tube 27. In order to allow the spring 70 to expand, the key surface 66 must be inserted into the keyway 38. Alternatively stated, if the key surface 66 and the keyway 38 are not properly aligned, the spring 70 will not fully pass through the end cap 33 and expand within the hub 34.

With additional reference again to the detail cloud of FIG. 4, the keyway 38 may provide an edge 39 against which the head or spring 70 catches to inhibit rotation of the spring relative to the keyway 38.

Figure 8:
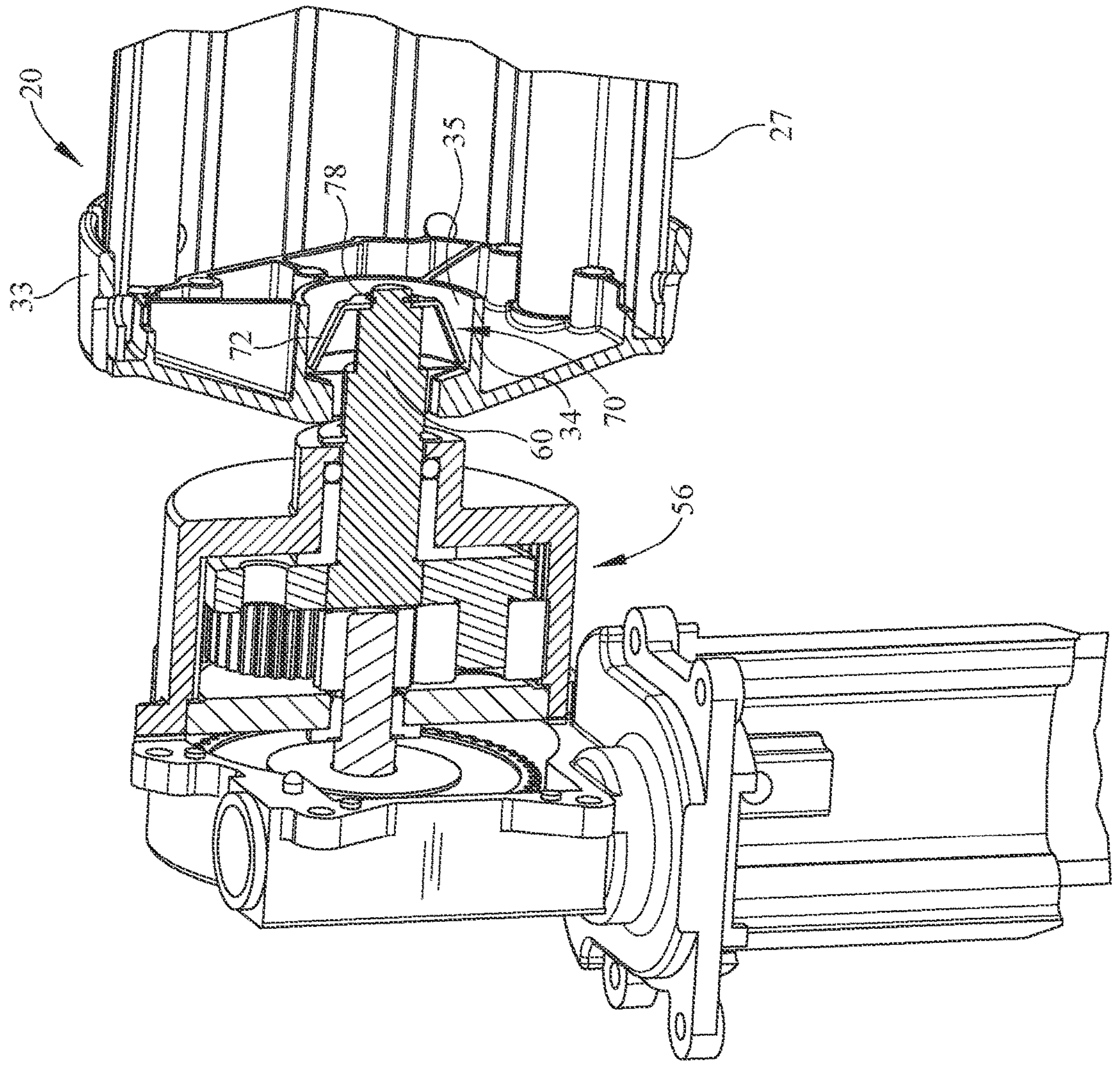
FIG. 8 is a section view of a portion of the awning assembly.

Referring now to FIG. 8, a rear section perspective assembly view of the relevant portion of the awning assembly 20 is depicted. In this view, the spring 70 is inserted into the end cap 33. The drive shaft 60 extends from the drive 56 and into the end cap 33, which is connected to the awning roller tube 27. The hub 34 receives the drive shaft 60 and the spring 70 is shown extending into the end cap 33 and expanded from the keyway 38 (FIG. 4) radially, outwardly toward a wall 35 defining the hub 34. In this way, once the drive shaft 60 is pushed into the end cap 33 and/or the roller awning tube 27, the structure is locked in place by wings 72, 74. In other embodiments, a hub 34 may be formed within the roller tube 27 and the spring 70 may be inserted to lock in such roller tube 27 but rather than the end cap 33. In either embodiment, no further fasteners are required to retain the drive shaft 60 in position relative to the end cap 33 and/or the awning roller tube 27. As a result, the structure cannot be disassembled, however, the installation is significantly eased and the number of parts required for the assembly is reduced, which reduces the complexity and the likelihood of incorrect assembly and/or installation.

Figure 9:
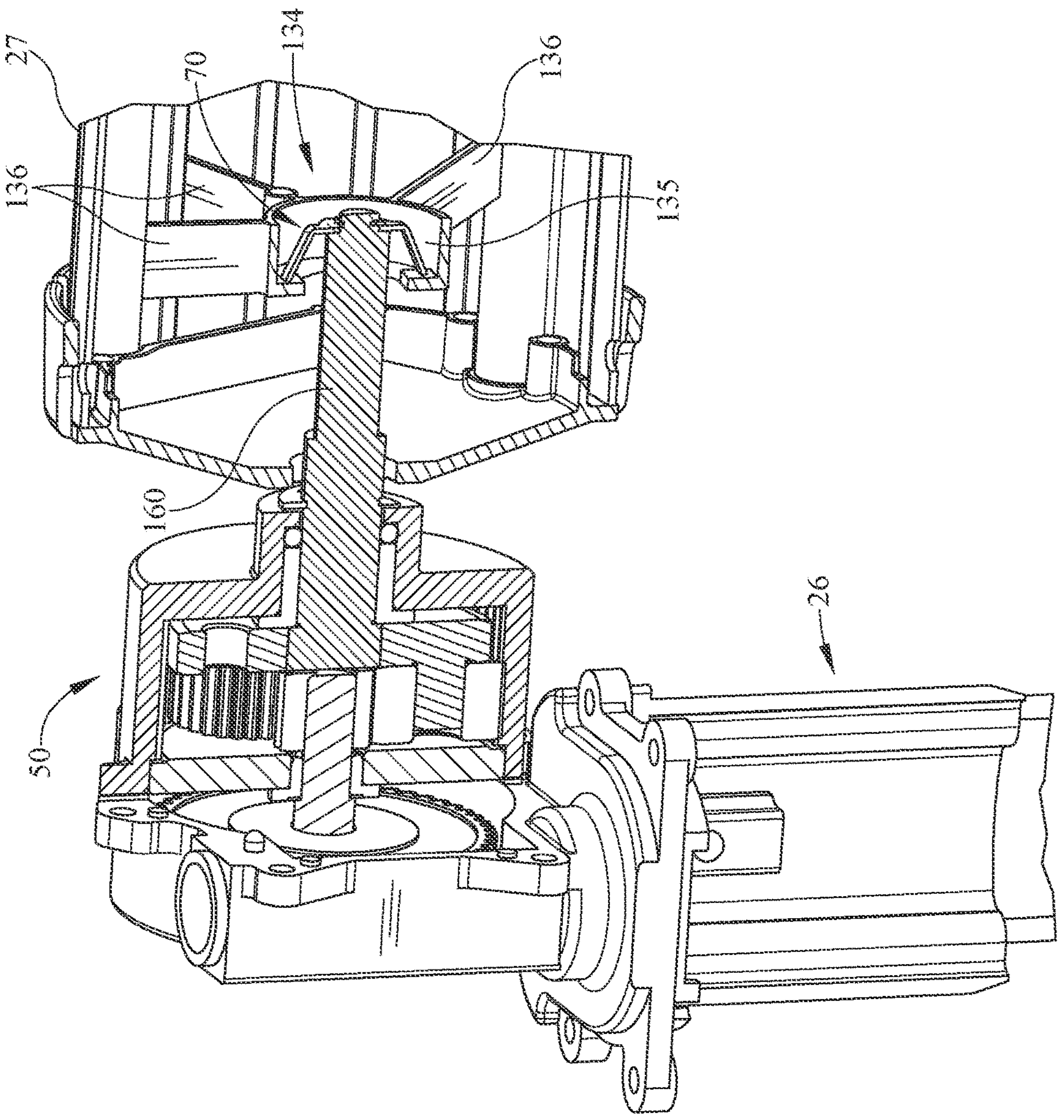
FIG. 9 is a section view of an alternate connection configuration.

Referring to FIG. 9, a further alternate embodiment is shown in a section view. The embodiment provides the hardware assembly 26, the drive assembly 50 and the awning roller tube 27. The embodiment provides that the connection of the head, embodied by the spring 70, is disposed in a hub 134 within the awning roller tube 27. As in the previous embodiment, the hub 134 may be defined in part by a wall 135 and have a plurality of strengthening ribs 136. This embodiment is made possible additionally by lengthening the drive shaft 160 extending from the drive assembly 50. The spring 70 is merely one embodiment of a head and other embodiments may be utilized. Further, rather than expand and compress the head, the roller tube 27 may comprise the expanding and compressing structures. For example, one or more springs may be located within the hub 134 to compress and allow a head on the drive shaft 60, 160 to pass, then expand once the head passes a threshold position, locking the shaft 60, 160 in position.

Figure 10:
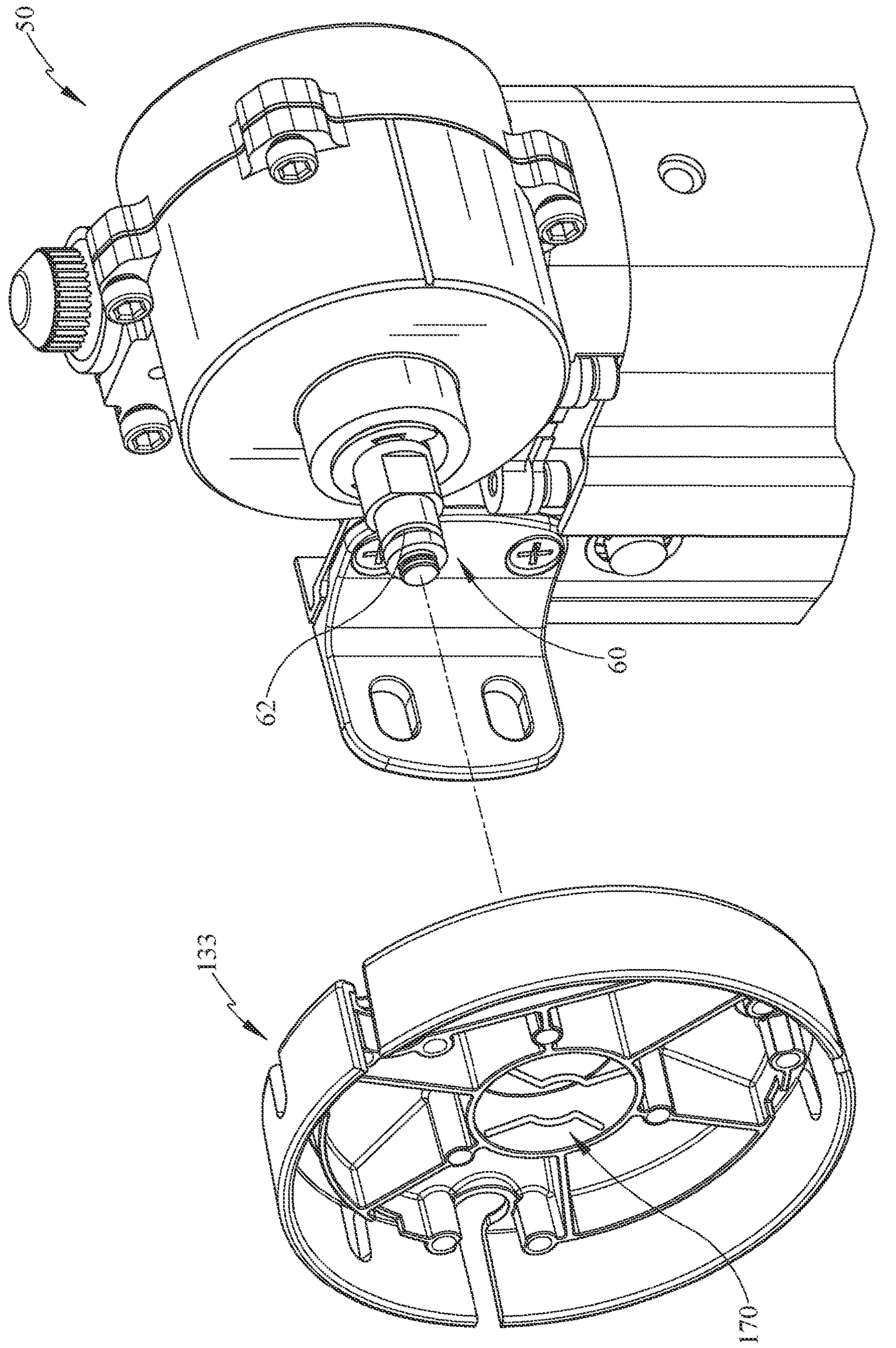
FIG. 10 is a perspective view of an alternate connection configuration.

Still further, and with reference to FIG. 10, an additional alternative embodiment is provided in perspective view. In the previous embodiments, the spring has been attached to the drive shaft 60 of the drive assembly 50. However, according to alternate embodiments, an end cap 133 is provided wherein a spring 170 is provided. In some embodiments, the spring may be a wire type spring which flexes to allow the accept the drive shaft 60. At some location, the spring 170 may be seated in a groove 62. While the spring 170 is shown in a wire form, the spring may alternatively be a flat spring having at least one edge which is seated in the groove 62.

Still further, in some embodiments, the spring 170, wire or flat spring for non-limiting example, may be located within the awning roller tube. As with earlier embodiments, the drive shaft 60 may be lengthened to reach such location within an exemplary awning roller tube 27.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A method of assembling an awning assembly, comprising the steps of:
- connecting a motor to awning hardware;
- positioning a spring having at least one wing on a drive shaft of said motor or a drive;
- compressing said spring as it passes into a hub of an end cap of an awning roller tube, said end cap having a hole with at least one keyway;
- expanding said spring within at least one of said end cap or said awning roller tube;
- locking said spring within said hub so that said drive shaft cannot be removed from at least one of said end cap or said awning roller tube without requiring at least some destruction of the spring.

2. The method of claim 1 further comprising permanently locking said motor to said at least one of said end cap or said awning roller tube.

3. The method of claim 1, further comprising pushing the spring through an axial side of said hub.

4. The method of claim 1, further comprising pushing the spring into the hub in said end cap or said awning roller tube.

5. A method of assembling an awning assembly, comprising the steps of:
- providing at least one of a motor and drive having a drive shaft;
- providing an awning roller tube and an end cap;
- pushing and locking one of: (a) said drive shaft to said end cap or (b) said end cap and said drive shaft to said awning roller tube;

providing a hub on said end cap or said awning roller tube, wherein a spring is locked during said pushing and locking;

engaging said spring with said drive shaft, wherein said spring cannot be removed from said hub without requiring at least some destruction of said spring;

wherein said locking is done free of screw fasteners.

6. The method of claim 5, said spring comprising at least one wing.

7. The method of claim 5, said spring being a wire spring.

* * * * *